(12) United States Patent
Yokota et al.

(10) Patent No.: US 6,939,929 B2
(45) Date of Patent: Sep. 6, 2005

(54) ALPHA-OLEFIN-AROMATIC VINYL COPOLYMER

(75) Inventors: Kiyohiko Yokota, Chiba (JP); Noriyuki Tani, Chiba (JP); Takashi Kanesaki, Chiba (JP); Nobuhide Ishihara, Chiba (JP)

(73) Assignee: Idemitsu Kosan Co. Ltd., Tokyo (JP)

( * ) Notice: Subject to any disclaimer, the term of this patent is extended or adjusted under 35 U.S.C. 154(b) by 0 days.

(21) Appl. No.: 10/048,487

(22) PCT Filed: Jun. 15, 2001

(86) PCT No.: PCT/JP01/05120

§ 371 (c)(1),
(2), (4) Date: Feb. 12, 2002

(87) PCT Pub. No.: WO01/96427

PCT Pub. Date: Dec. 20, 2001

(65) Prior Publication Data

US 2002/0161142 A1 Oct. 31, 2002

(30) Foreign Application Priority Data

Jun. 16, 2000 (JP) .................... 2000-181592

(51) Int. Cl.[7] .................. C08F 4/64; C08F 212/06; C08F 212/08
(52) U.S. Cl. ............. 526/160; 526/132; 526/133; 526/347; 526/165; 526/943
(58) Field of Search ............. 526/160, 165, 526/132, 133, 347, 943

(56) References Cited

U.S. PATENT DOCUMENTS

| | | | |
|---|---|---|---|
| 5,854,165 A | 12/1998 | Yabunouchi et al. | |
| 6,107,232 A | 8/2000 | Yokota | |
| 6,171,994 B1 | 1/2001 | Yabunouchi et al. | |
| 6,235,855 B1 * | 5/2001 | Arai et al. | |
| 6,339,135 B1 | 1/2002 | Kashiwamura et al. | |
| 6,423,807 B1 * | 7/2002 | Oi et al. | |

FOREIGN PATENT DOCUMENTS

| | | |
|---|---|---|
| EP | 0 416 815 | 3/1991 |
| EP | 0 872 492 | 10/1998 |
| EP | 970976 | 1/2000 |
| EP | 0 985 689 | 3/2000 |
| JP | 3-163088 | 7/1991 |
| JP | 11-199614 | 7/1999 |
| JP | 11-199623 | 7/1999 |
| JP | 2000-119337 | 4/2000 |

OTHER PUBLICATIONS

F. G. Sernetz, et al., Macromolecules, vol. 30, No. 6, pp. 1562–1569, XP–000682472, "Copolymerization of Ethene With Styrene Using Methylaluminoxane–Activated Bis(Phenolate) Complexes", 1997.

F. G. Sernetz, et al., Journal of Polymer Science, vol. 35, No. 8, pp. 1571–1578, XP–002124938, "Copolymerization of Ethene With Styrene Using Different Methylalumoxane Activated Half–Sandwich Complexes", 1997.

T. Arai, et al., Macromolecular: Rapid Communications, vol. 19, No. 6, pp. 327–331, XP–000777591, "Stereoregular and Bernoullian Copolymerization of Styrene and Ethylene by Bridged Metallocene Catalysts", 1998.

F. G. Sernetz, et al., Journal of Polymer Science, vol. 35, No. 13, pp. 2549–2560, XP–00721378, "Metallocene–Catalyzed Ethene/Styrene Co– and Terpolymerization With Olefinic Termonomers", Sep. 30, 1997.

* cited by examiner

*Primary Examiner*—Caixia Lu
(74) *Attorney, Agent, or Firm*—Oblon, Spivak, McClelland, Maier & Neustadt, P.C.

(57) ABSTRACT

The α-olefin-aromatic vinyl compound copolymer of the present invention is obtained by using a transition metal compound represented by the following Formula (1) and a promoter component to carry out copolymerization, and it is a novel α-olefin-aromatic vinyl compound copolymer having a low alternating property and a high blocking property, particularly a high blocking property related to the aromatic vinyl compound:

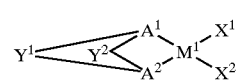

(1)

wherein $A^1$ and $A^2$ represent a cyclopentadienyl group, a substituted cyclopentadienyl group or the like; $Y^1$ and $Y^2$ represent a substituted or unsubstituted alkylene group or the like, and at least one of them is the substituted or unsubstituted alkylene group; $M^1$ represents titanium or the like; $X^1$ and $X^2$ represent a hydrogen atom, a halogen atom or the like.

17 Claims, 3 Drawing Sheets

ALPHA-OLEFIN-AROMATIC VINYL COPOLYMER

BACKGROUND OF THE INVENTION

The present invention relates to an α-olefin-aromatic vinyl compound copolymer. More specifically, it relates to a novel α-olefin-aromatic vinyl compound copolymer having a low alternating property and a high blocking property, particularly a high blocking property originating in the aromatic vinyl compound.

RELATED ART

In the production of α-olefin-aromatic vinyl compound copolymers such as an ethylene-styrene copolymer, methods for carrying out copolymerization with a Ziegler-Natta catalyst have so far been investigated, but there have been the defects that the copolymerization activity is not sufficiently high and the copolymerizing property is low and that only the copolymers mixed with a large amount of the homopolymers are obtained.

On the other hand, proposed in recent years are (1) a method in which metallocene compounds or cross-linked diphenoxy compounds are used (2) a method in which alumoxane or a borate compound is used. They include, for example, Japanese Patent Application Laid-Open No. 25007/1991, Japanese Patent Application Laid-Open No. 49132/1994, Japanese Patent Application Laid-Open No. 278230/11995, Japanese Patent Application Laid-Open No. 269134/1996, Japanese Patent Application Laid-Open No. 40709/1997, Japanese Patent Application Laid-Open No. 183809/1997, Japanese Patent Application Laid-Open No. 302014/1997, Japanese Patent Application Laid-Open No. 309925/1997 and Japanese Patent No. 2684154. Use of these catalysts provides copolymers in which a polymerization activity per transition metal in the production of ethylene-styrene copolymers is very high and in which molecular weight distribution is narrow. However, the copolymers had a high alternating property and a large flexibility but were low in an elastic modulus and a break strength and inferior in a mechanical strength. Thus, it has been requested in the ethylene-styrene copolymers to further elevate the mechanical strength and sufficiently derive the properties of the copolymers. A production process for a copolymer having a low alternating property and a high blocking property has been desired in order to satisfy such requirements as described above.

DISCLOSURE OF THE INVENTION

An object of the present invention is to improve the foregoing problems in an α-olefin-aromatic vinyl compound copolymer and provide a novel α-olefin-aromatic vinyl compound copolymer having a low alternating property and a high blocking property, particularly a high blocking property related to the aromatic vinyl compound.

Intensive researches repeated by the present inventors in order to solve the problems described above have resulted in finding that a catalyst comprising a transition metal compound having a specific chemical structure combined with a promoter component provides an excellent copolymerizing property of α-olefin with an aromatic vinyl compound, and they have come to complete the present invention based on these findings.

That is, the present invention comprises the following items:

[1] An α-olefin-aromatic vinyl compound copolymer comprising α-olefin and an aromatic vinyl compound, wherein the aromatic vinyl compound has a content of 0.1 to 90 mole %; the molecular weight distribution measured by a GPC method is 3.0 or less; in $^{13}$C-NMR measurement, a signal (Sβδ) based on an (aromatic vinyl compound-olefin-olefin) chain and a signal (Sββ) based on an (aromatic vinyl compound-olefin-aromatic vinyl compound) chain are present, and a signal (Tββ) based on a blocking (aromatic vinyl compound-aromatic vinyl compound-aromatic vinyl compound) chain in the aromatic vinyl compound and a signal (Sδδ) based on a blocking (olefin-olefin-olefin) chain in the olefin part are present; and an index (θ) showing a blocking property of the aromatic vinyl compound component which is represented by the following relational equation is 10 to 80 (%):

$$\theta = I(T\beta\beta + T\beta\delta)/[I(T\delta\delta + T\gamma\delta + T\beta\beta + T\beta\delta)] \times 100$$

wherein I(Tββ+Tβδ) represents the sum of the intensities of the signals Tββ and Tβδ in $^{13}$C-NMR measurement, provided that Tβδ represents a signal based on an (aromatic vinyl compound-aromatic vinyl compound-olefin) chain; and I(Tδδ+Tγδ+Tββ+Tβδ) represents the sum of the intensities of the respective intensities of the signals Tδδ, Tγδ, Tββ and Tβδ based on all chains in which the aromatic vinyl compound participates among the chains of the above copolymer in $^{13}$C-NMR measurement, provided that Tδδ represents a signal based on an (olefin-aromatic vinyl compound-olefin) chain, and Tγδ represents a signal based on a heterogeneous bond of an (aromatic vinyl compound-aromatic vinyl compound-olefin-olefin) chain or a signal based on a heterogeneous bond of an (aromatic vinyl compound-olefin-aromatic vinyl compound-olefin) chain.

[2] The α-olefin-aromatic vinyl compound copolymer as described in the above item [1], wherein the index (θ) showing a blocking property of the aromatic vinyl compound component is 10 to 70 (%).

[3] The α-olefin-aromatic vinyl compound copolymer as described in the above item [1] or [2], wherein the aromatic ring is atactic in the chain of the aromatic vinyl compound component contained in the copolymer.

[4] The α-olefin-aromatic vinyl compound copolymer as described in any of the above items [1] to [3], wherein the α-olefin is copolymerized with the aromatic vinyl compound in the presence of a polymerization catalyst comprising a transition metal compound (A) and a promoter catalyst component (B).

The α-olefin-aromatic vinyl compound copolymer as described in the above item [4], wherein used is a polymerization catalyst comprising an alkylating agent (C) added as a catalyst component in addition to the component (A) and the component (B) as described in the above item [4].

[6] The α-olefin-aromatic vinyl compound copolymer as described in the above item [4] or [5], wherein the component (A) in the polymerization catalyst described above is any of transition metal compounds represented by the following Formulas (1), (2) or (3):

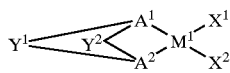
(1)

wherein $A^1$ and $A^2$ each represent independently a cyclopentadienyl group, a substituted cyclopentadienyl group, an indenyl group or a substituted indenyl group; $Y^1$ and $Y^2$ each represent independently a substituted or unsubstituted alkylene group or a substituted or unsubstituted silylene group, and at least one of them is the substituted or unsubstituted alkylene group; $M^1$ represents titanium, zirconium or hafnium; $X^1$ and $X^2$ each represent independently a hydrogen atom, a halogen atom, an alkyl group, an alkoxy group or an aryloxy group:

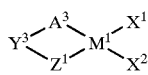
(2)

wherein $A^3$ represents a cyclopentadienyl group, a substituted cyclopentadienyl group, an indenyl group or a substituted indenyl group, and they have at least one unsubstituted part in the substituted cyclopentadienyl group and the substituted indenyl group; $Y^3$ represents a substituted or unsubstituted alkylene group or a silylene group; $Z^1$ is O, S, NR, PR or $CR_2$ or represents a neutral two electron-donating ligand selected from OR, SR, $NR_2$ or $PR_2$ (R represents a hydrogen atom, a halogen atom, a hydrocarbon group having 1 to 20 carbon atoms, a halogen-containing hydrocarbon group having 1 to 20 carbon atoms or a hetero atom-containing group having 1 to 20 carbon atoms, and R may be the same or different when plural R's are present); $M^1$ represents titanium, zirconium or hafnium; $X^1$ and $X^2$ each represent independently a hydrogen atom, a halogen atom, an alkyl group, an alkoxy group or an aryloxy group:

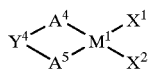
(3)

wherein $A^4$ and $A^5$ each represent independently a cyclopentadienyl group, a substituted cyclopentadienyl group, an indenyl group or a substituted indenyl group, and the substituted cyclopentadienyl group and the substituted indenyl group have at least one unsubstituted part; $Y^4$ represents a substituted or unsubstituted alkylene group; $M^1$ represents titanium, zirconium or hafnium; $X^1$ and $X^2$ each represent independently a hydrogen atom, a halogen atom, an alkyl group, an alkoxy group or an aryloxy group.

[7] The α-olefin-aromatic vinyl compound copolymer as described in any of the above items [4] to [6], wherein the promoter of the component (B) is any of alumoxane, boroxane, borate, an ionic compound, Lewis acid or clay or a mixture thereof.

[8] The α-olefin-aromatic vinyl compound copolymer as described in any of the above items [5] to [7], wherein the alkylating agent of the component (C) is an organic aluminium compound, an organic magnesium compound or an organic zinc compound.

[9] The α-olefin-aromatic vinyl compound copolymer as described in any of the above items [1] to [8], wherein the aromatic vinyl compound is styrene.

BEST MODE FOR CARRYING OUT THE INVENTION

Figure 1:
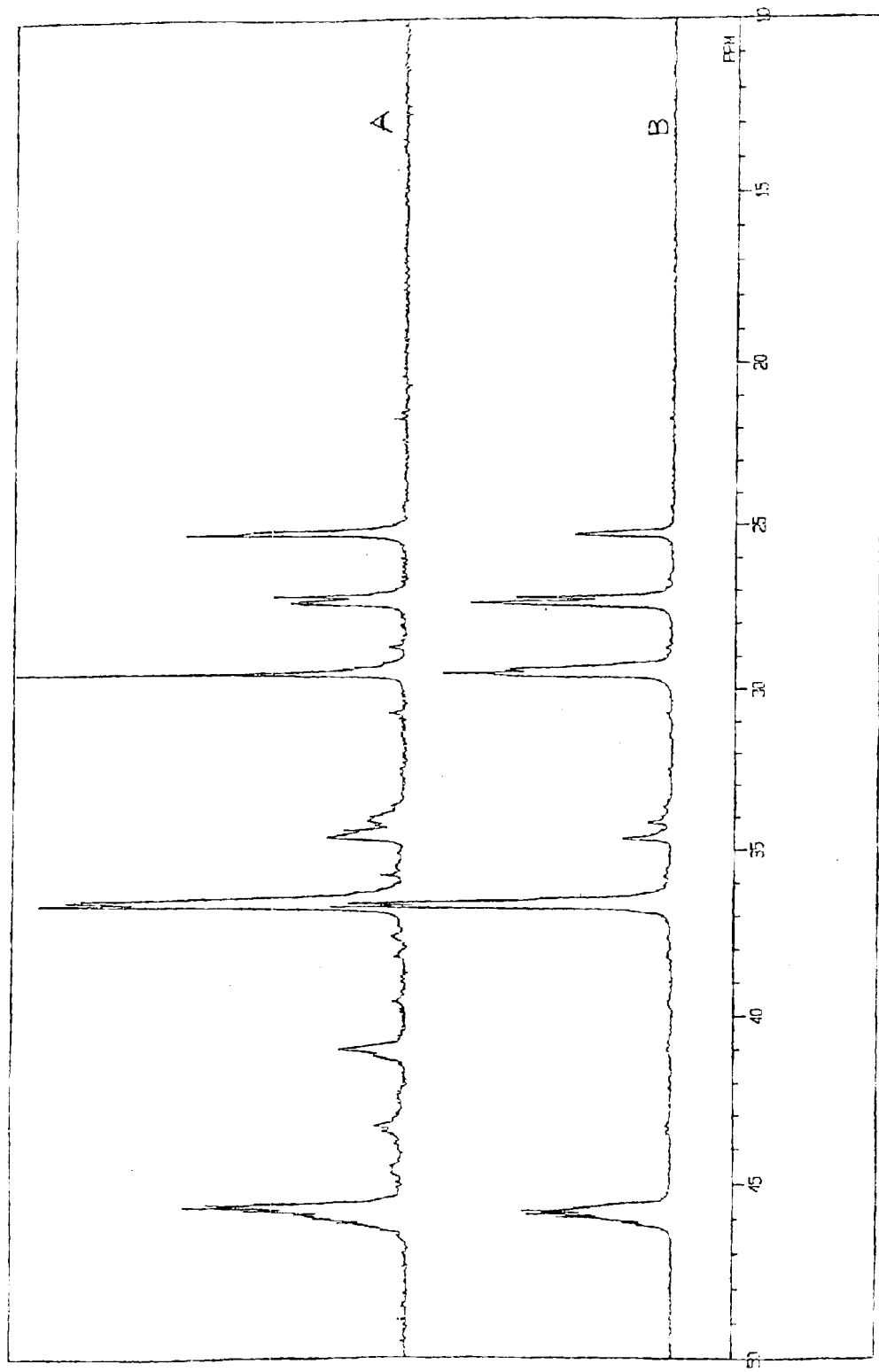
FIG. 1 is a $^{13}$C-NMR of the ethylene-styrene copolymer (A) prepared in Example 1 and a $^{13}$C-NMR of the ethylene-styrene copolymer (B) prepared in Comparative Example 1.

The present invention relates to the copolymer comprising the α-olefin and the aromatic vinyl compound described above and to the α-olefin-aromatic vinyl compound copolymer having a low alternating property and a high blocking property, particularly a high blocking property originating in the aromatic vinyl compound. This makes it possible to further elevate the mechanical strength more than those of existing products do and sufficiently derive the properties of the comonomer.

The α-olefin-aromatic vinyl compound copolymer of the present invention (hereinafter referred to as the copolymer of the present invention) shall be explained below in details.

The α-olefin-aromatic vinyl compound copolymer of the present invention is a copolymer comprising the α-olefin and the aromatic vinyl compound, wherein the aromatic vinyl compound has a content of 0.1 to 90 mole %; the molecular weight distribution measured by a GPC method is 3.0 or less; in $^{13}$C-NMR measurement, a signal (Sβδ) based on an (aromatic vinyl compound-olefin-olefin-olefin) chain and a signal (Sββ) based on an (aromatic vinyl compound-olefin-aromatic vinyl compound) chain are present, and a signal (Tββ) based on a blocking (aromatic vinyl compound-aromatic vinyl compound-aromatic vinyl compound) chain in the aromatic vinyl compound and a signal (Sδδ) based on a blocking (olefin-olefin-olefin) chain in the olefin part are present; and an index (θ) showing a blocking property of the aromatic vinyl compound component which is represented by the following relational equation is 10 to 80 (%):

$$\theta = I(T\beta\beta + T\beta\delta)/[I(T\delta\delta + T\gamma\delta + T\beta\beta + T\beta\delta)] \times 100$$

wherein I(Tββ+Tβδ) represents the sum of the signals Tββ and Tβδ in $^{13}$C-NMR measurement, provided that Tβδ represents a signal based on a (aromatic vinyl compound-aromatic vinyl compound-olefin) chain; and I(Tδδ+Tγδ+Tββ+Tβδ) represents the sum of the respective intensities of the signals Tδδ, Tγδ, Tββ and Tβδ based on all chains in which the aromatic vinyl compound participates among the chains of the above copolymer in $^{13}$C-NMR measurement, provided that Tδδ represents a signal based on an (olefin-aromatic vinyl compound-olefin) chain, and Tγδ represents a signal based on a heterogeneous bond of an (aromatic vinyl compound-aromatic vinyl compound-olefin-olefin) chain or a signal based on a heterogeneous bond of an (aromatic vinyl compound-olefin-aromatic vinyl compound-olefin) chain.

The α-olefin-aromatic vinyl compound copolymer of the present invention is a copolymer comprising the α-olefin and the aromatic vinyl compound and substantially contains the copolymer of the α-olefin and the aromatic vinyl compound. This is supported by that a signal (Sβδ) based on an (aromatic vinyl compound-olefin-olefin) chain and a signal (Sββ) based on an (aromatic vinyl compound-olefin-aromatic vinyl compound) chain are present in $^{13}$C-NMR measurement.

In the copolymer of the present invention, a signal (Tββ) based on a blocking (aromatic vinyl compound-aromatic vinyl compound-aromatic vinyl compound) chain in the aromatic vinyl compound and a signal (Sδδ) based on a blocking (olefin-olefin-olefin) chain in the olefin part are further present in $^{13}$C-NMR measurement. These make it possible to further elevate the mechanical strength more than those of existing products and sufficiently derive the properties of the comonomer.

Further, the copolymer of the present invention has a high blocking property, particularly a high blocking property of the aromatic vinyl compound component, and the index (θ: hereinafter referred to as a blocking index) showing a blocking property of the aromatic vinyl compound component which is represented by the relational equation described above is 10 to 80 (%), preferably 10 to 70 (%). If θ is less than 10 (%), the blocking property is too low, and the mechanical property can not be elevated. On the other hand, if it exceeds 80 (%), a balance between the flexibility and the mechanical strength is reduced.

In the formula described above, I(Tββ+Tβδ) represents the sum of the intensities of the signals Tββ and Tβδ in $^{13}$C-NMR measurement, provided that Tβδ represents a signal based on an (aromatic vinyl compound-aromatic vinyl compound-olefin) chain. Accordingly, these two signals show that the blocking property of the aromatic vinyl compound is strongly reflected. On the other hand, I(Tδδ+Tγδ+Tββ+Tβδ) represents the sum of the respective intensities of the signals Tδδ, Tγδ, Tββ and Tβδ based on all chains in which the aromatic vinyl compound participates among the chains of the above copolymer in $^{13}$C-NMR measurement, provided that Tδδ represents a signal based on an (olefin-aromatic vinyl compound-olefin) chain, and Tγδ represents a signal based on a heterogeneous bond of an (aromatic vinyl compound-aromatic vinyl compound-olefin-olefin) chain or a signal based on a heterogeneous bond of an (aromatic vinyl compound-olefin-aromatic vinyl compound-olefin) chain.

The heterogeneous bond described above means a head to head bond or a tail to tail bond against a head to tail bond which is a usual bonding way of monomers.

The measurement of $^{13}$C-NMR in the present invention is carried out by means of Lambda 500 manufactured by Nippon Denshi Co., Ltd., wherein an NMR tube-having a diameter of 1 cm is charged with a sample; a 1,2,4 trichlorobenzene/deuterated benzene=9/1 solvent was added thereto; the tube was heated to 140° C. to dissolve the sample; and then it is heated to 130° C.

The copolymer of the present invention has an aromatic vinyl compound content of 0.1 to 90 mole %, and the content can be optional in this range. If it is less than 0.1 mole %, the mechanical property can not be elevated. On the other hand, if it exceeds 90 mole %, a balance between the flexibility and the mechanical strength is reduced.

In the copolymer of the present invention, a molecular weight distribution measured by a GPC method which is shown by a ratio (Mw/Mn) of a weight average molecular weight (Mw) to a number average molecular weight (Mn) is 3.0 or less, preferably 1.5 to 3.0. The molecular weight distribution is measured by a gel permeation chromatograph (GPC) method. In respect to the measuring conditions of GPC, a GPC column Shodex UT 806L is used, and measurement is carried out at a temperature of 145° C. and a flow velocity of 1.0 ml/minute using 1,2,4-trichlorobenzene as a solvent. If the molecular weight distribution is 3.0 or more, stickiness is brought about, and the moldability and the surface characteristics are reduced.

The copolymer of the present invention shall not specifically be restricted as far as stereoregularity is concerned. In the chain of the aromatic vinyl compound component in the polymer chain, the polymer in which an aromatic ring has an atactic stereoregularity shows flexibility and is preferably used in the fields in which the above characteristic is required, for example, the film and sheet field in which soft vinyl chloride resins are used. The stereoregularity can be measured, for example, by means of a $^{13}$C-NMR.

The copolymer of the present invention has a weight average molecular weight in terms of polystyrene of usually 1,000 to 1,000,000, preferably 5,000 to 800,000, and it can suitably be selected in this range.

The copolymer of the present invention is a copolymer comprising the α-olefin and the aromatic vinyl compound, and it may be a ternary or quaternary copolymer, if satisfying the requisites described above, further comprising cyclic olefin and/or diene in addition to the α-olefin and the aromatic vinyl compound.

The suitable α-olefin includes, for example, ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexene, hexafluoropropene, terafluoroethylene, 2-fluoropropene, fluoroethylene, 1,1-difluoroethylene, 3-fluoropropene, trifluoroethylene and 3,4-dichloro-1-butene.

Further, suitably used as the aromatic vinyl compound are styrene, alkylstyrenes such as p-methylstyrene, p-ethylstyrene, p-propylstyrene, p-isopropylstyrene, p-butylstyrene, p-tert-butylstyrene, o-methylstyrene, o-ethylstyrene, o-propylstyrene, o-isopropylstyrene, m-methylstyrene, m-ethylstyrene, m-propylstyrene, m-isopropylstyrene, m-butylstyrene, mesitylstyrene, 2,4-dimethylstyrene, 2,5-dimethylstyrene and 3,5-dimethylstyrene; alkoxystyrenes such as p-methoxystyrene, o-methoxystyrene and m-methoxystyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; p-phenylstyrerne, trimethylsilylstytrene, vinyl benzoate and divinylbenzene.

Suitable cyclic olefin includes cyclopentene, cyclohexene, norbornene, 1-methylnorbornene, 5-methylnorbornene, 7-methylnorbornene, 5-ethylnorbornene, 5-propylnorbornene, 5-phenylnorbornene, 5-benzylnorbornene, 5,6-dimethylnorbornene and 5,5,6-trimethylnorbornene.

Further, 1,3-butadiene, 1,4-pentadiene and 1,5-hexadiene are used as diene.

The α-olefins, the aromatic vinyl compounds, the cyclic olefins and the dienes each described above may be used alone or in a mixture of two or more kinds thereof.

To be specific, the α-olefin-aromatic vinyl compound copolymer of the present invention includes ethylene-styrene copolymers, propylene-styrene copolymers and butene-1-styrene copolymers. These α-olefin-aromatic vinyl compound copolymers have an aromatic vinyl compound content of 0.1 to 90 mole %, and the content can be optional in this range. In order to secure the flexibility close to that of a soft vinyl chloride resin the alternate resin of which is claimed to be developed because of an environmental problem, the aromatic vinyl compound content is preferably lower. To be specific, it is 0.1 to 30 mole %, preferably 1 to 30 mole % and particularly preferably 10 to 30 mole %. On the other hand, the aromatic vinyl compound content is preferably high if taking a serious view of the mechanical strength. To be specific, it is 35 to 90 mole %, preferably 40 to 90 mole %.

The ternary copolymer comprising the α-olefin, the aromatic vinyl compound, the cyclic olefin or diene includes, for example, ethylene-styrene-norbornene copolymers, ethylene-styrene-butadiene copolymers and ethylene-styrene-1,5-hexadiene copolymers. The proportions of a structural unit originating in the α-olefin, a structural unit originating in the aromatic vinyl compound and a structural unit originating in cyclic olefin or diene in the polymer chains of these α-olefin-aromatic vinyl compound-cyclic olefin copolymers and α-olefin-aromatic vinyl compound-diene copolymers can be optional. The copolymers having an aromatic vinyl compound content of 50 mole % or less and a cyclic olefin or diene content of 20 mole % or less are particularly preferred because they show a high elastic recovery property and are highly practical copolymers.

A method for producing the α-olefin-aromatic vinyl compound copolymer of the present invention includes a method in which the α-olefin is copolymerized with the aromatic vinyl compound in the presence of the polymerization catalyst prepared by adding the transition metal compound component (A), the promoter component (B) and, if necessary, the aklkylating agent (C) as a catalyst component.

The transition metal compound of the component (A) described above includes the compounds represented by the following Formulas (1), (2) or (3):

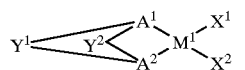
(1)

wherein $A^1$ and $A^2$ each represent independently a cyclopentadienyl group, a substituted cyclopentadienyl group, an indenyl group or a substituted indenyl group; $Y^1$ and Y2 each represent independently a substituted or unsubstituted alkylene group or a substituted or unsubstituted silylene group, and at least one of them is the substituted or unsubstituted alkylene group; $M^1$ represents titanium, zirconium or hafnium; $X^1$ and $X^2$ each represent independently a hydrogen atom, a halogen atom, an alkyl group, an alkoxy group or an aryloxy group:

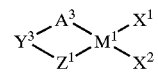
(2)

wherein $A^3$ represents a cyclopentadienyl group, a substituted cyclopentadienyl group, an indenyl group or a substituted indenyl group, and the substituted cyclopentadienyl group and the substituted indenyl group have at least one unsubstituted part; $Y^3$ represents a substituted or unsubstituted alkylene group or a silylene group; $Z^1$ is O, S, NR, PR or $CR_2$ or represents a neutral two electron-donating ligand selected from OR, SR, $NR_2$ or $PR_2$ (R represents a hydrogen atom, a halogen atom, a hydrocarbon group having 1 to 20 carbon atoms, a halogen-containing hydrocarbon group having 1 to 20 carbon atoms or a hetero atom-containing group having 1 to 20 carbon atoms, and R may be the same or different when plural R's are present); $M^1$ represents titanium, zirconium or hafnium; $X^1$ and $X^2$ each represent independently a hydrogen atom, a halogen atom, an alkyl group, an alkoxy group or an aryloxy group:

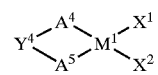
(3)

wherein $A^4$ and $A^5$ each represent independently a cyclopentadienyl group, a substituted cyclopentadienyl group, an indenyl group or a substituted indenyl group, and they have at least one unsubstituted part in the substituted cyclopentadienyl group and the substituted indenyl group; $Y^4$ represents a substituted or unsubstituted alkylene group; $M^1$ represents titanium, zirconium or hafnium; $X^1$ and $X^2$ each represent independently a hydrogen atom, a halogen atom, an alkyl group, an alkoxy group or an aryloxy group.

It is important that in this transition metal compound represented by Formula (1), at least one cross-linking group of $Y^1$ and $Y^2$ in the formula is a cross-linking group consisting only of a carbon-carbon bond, and specific examples of the titanium compounds having such chemical structure include, for example, (isopropylidene)(dimethylsilylene)bis(cyclopentadienyl)titanium dichloride, (isopropylidene)(dimethylsilylene)bis(cyclopentadienyl) titanium dimethyl, (isopropylidene)(dimethylsilylene)bis (cyclopentadienyl)titanium dibenzyl, (isopropylidene)(dimethylsilylene)bis(cyclopentadienyl)titanium diphenyl, (isopropylidene)(dimethylsilylene)bis(cyclopentadienyl) titanium dimethoxide, (isopropylidene)(dimethylsilylene) bis(cyclopentadienyl)titanium diphenoxide, (isopropylidene)(dimethylsilylene)bis(cyclopentadienyl) titanium bis(trimethylsilyl), (isopropylidene) (dimethylsilylene)bis-(cyclopentadienyl)titanium bis (trimethylsilylmethyl), (isopropylidene)(dimethylsilylene) bis(cyclopentadienyl)titanium bis(trifluoromethane-sulfonate), (isopropylidene)(dimethylsilylene)bis-(cyclopentadienyl)titanium dihydride, (isopropylidene) (dimethylsilylene)bis-(cyclopentadienyl)titanium chlorohydride, (isopropylidene)(dimethylsilylene)bis (cyclopentadienyl)titanium chloromethoxide, (1,1'-isopropylidene)(2,2'-dimethylsilylene)bis(4-methylcyclopentadienyl)titanium dichloride, (1,1'-isopropylidene)(2,2'-dimethylsilylene)bis(3,5-dimethylcyclopentadienyl)titanium dichloride, (1,1'- isopropylidene)(2,2'-dimethylsilylene)bis(3,4,5-trimethylcyclopentadienyl)titanium dichloride, (1,1'-isopropylidene)(2,2'-dimethylsilylene)bis(3,4-dimethylcyclopentadienyl)titanium dichloride, (1,1'-isopropylidene)(2,2'-dimethylsilylene)bis(3,4-diethylcyclopentadienyl)titanium dichloride, (1,1'-isopropylidene)(2,2'-dimethylsilylene)bis(3,4-diisopropylcyclopentadienyl)titanium dichloride, (1,1'-isopropylidene)(2,2'-dimethylsilylene)bis(3,4-di-n-butylcyclopentadienyl)titanium dichloride, (1,1'-isopropylidene)(2,2'-dimethylsilylene)bis(3,4-di-tert-butylcyclopentadienyl)titanium dichloride, (1,1'-isopropylidene)(2,2'-dimethylsilylene)bis(3,4-diphenylcyclopentadienyl)titanium dichloride, (1,1'-isopropylidene)(2,2'-dimethylsilylene)bis(3,4-dibenzylcyclopentadienyl)titanium dichloride, (2,2'-isopropylidene)(1,1'-dimethylsilylene)bis(indenyl)titanium dichloride, (1,2'-isopropylidene)(2,1'-dimethylsilylene)bis(indenyl)titanium dichloride, (2,2'-isopropylidene)(1,1'-dimethylsilylene)bis(tetrahydroindenyl)titanium dichloride, (2,2'-isopropylidene)(1,1'-dimethylsilylene)bis(3-methylindenyl)titanium dichloride, (2,2'-isopropylidene)(1,1'-dimethylsilylene)bis(3-isopropylindenyl)titanium dichloride, (2,2'-isopropylidene)(1,1'-dimethylsilylene)bis(3-n-butylindenyl)titanium dichloride, (2,2'-isopropylidene)(1,1'-dimethylsilylene)bis(3-tert-butylindenyl)titanium dichloride, (2,2'-isopropylidene)(1,1'-dimethylsilylene)bis(3-phenylindenyl)titanium dichloride, (2,2'-isopropylidene)(1,1'-dimethylsilylene)bis(3-benzylindenyl)titanium dichloride, (2,2'-isopropylidene)(1,1'-dimethylsilylene)bis(4,7-dimethylindenyl)titanium dichloride, (2,2'-isopropylidene)(1,1'-dimethylsilylene)bis(3,4,7-trimethylindenyl)titanium dichloride, (2,2'-isopropylidene)(1,1'-dimethylsilylene)bis(5,6-dimethylindenyl)titanium dichloride, (2,2'-isopropylidene)(1,1'-dimethylsilylene)bis(4-phenylindenyl)titanium dichloride, (2,2'-isopropylidene)(1,1'-dimethylsilylene)bis(5-phenylindenyl)titanium dichloride, (2,2'-isopropylidene)(1,1'-dimethylsilylene)bis(6-phenylindenyl)titanium dichloride, (2,2'-isopropylidene)(1,1'-dimethylsilylene)bis(4-phenyl-7-methylindenyl)titanium dichloride, (2,2'-isopropylidene)(1,1'-dimethylsilylene)bis(4,5-benzoindenyl)titanium dichloride, (2,2'-isopropylidene)(1,1'-dimethylsilylene)bis(5,6-benzoindenyl)titanium dichloride, (2,2'-isopropylidene)(1,1'-dimethylsilylene)bis(6,7-benzoindenyl)titanium dichloride, (1,1'-isopropylidene)(2,2'-dimethylsilylene)(4-methylcyclopentadienyl)(3',5'-dimethylcyclopentadienyl)titanium dichloride, (1,1'-isopropylidene)(2,2'-dimethylsilylene)(4-methylcyclopentadienyl)(3',5'-diisopropylcyclopentadienyl)titanium dichloride, (1,1'-isopropylidene)(2,2'-dimethylsilylene)(4-methylcyclopentadienyl)(3',5'-diphenylcyclopentadienyl)titanium dichloride, (1,1'-isopropylidene)(2,2'-dimethylsilylene)(4-tert-butylcyclopentadienyl)(3',5'-dimethylcyclopentadienyl)titanium dichloride, (1,1'-isopropylidene)(2,2'-dimethylsilylene)(4-phenylcyclopentadienyl)(3',5'-dimethylcyclopentadienyl)titanium dichloride, (1,1'-isopropylidene)(2,2'-dimethylsilylene)(cyclopentadienyl)(3',4'-dimethylcyclopentadienyl)titanium dichloride, (1,1'-isopropylidene)(2,2'-dimethylsilylene)(cyclopentadienyl)(3',4'-diisobutylcyclopentadienyl)titanium dichloride, (1,1'-isopropylidene)(2,2'-dimethylsilylene)(3,4-dimethylcyclopentadienyl)(3',5'-diphenylcyclopentadienyl)titanium dichloride, (1,1'-isopropylidene)(2,2'-dimethylsilylene)(3,4-dimethylcyclopentadienyl)(3',5'-diisopropylcyclopentadienyl)titanium dichloride, (1,1'-isopropylidene)(2,2'-dimethylsilylene)(3,4-dimethylcyclopentadienyl)(3',5'-diphenylcyclopentadienyl)titanium dichloride, (2,2'-isopropylidene)(1,1'-dimethylsilylene)-(cyclopentadienyl)(indenyl)titanium dichloride, (ethylene)(dimethylsilylene)bis(cyclopentadienyl)titanium dichloride, (2,2'-ethylene)(1,1'-dimethylsilylene)bis(indenyl)titanium dichloride, (1,2'-ethylene)(2,1'-dimethylsilylene)bis(indenyl)titanium dichloride, bis(isopropylidene)bis-(cyclopentadienyl)titanium dichloride, (ethylene)(isopropylidene)bis(cyclopentadienyl)titanium dichloride, bis(ethylene)bis(cyclopentadienyl)titanium dichloride, (isopropylidene)(dimethylgermylene)bis(cyclopentadienyl)titanium dichloride, (2,1'-ethylene)bis(indenyl)titanium dichloride, (1,2'-ethylene)(2,1'-ethylene)-bis(3-n-butylindenyl)titanium dichloride and (1,2'-ethylene)(2,1'-ethylene)bis(3-trtimethylsilyl-indenyl)titanium dichloride.

It is important that this transition metal compound represented by Formula (2) has at least one non-substituted part in the substituted cyclopentadienyl group and the substituted indenyl group in the formula, and such compound includes dimethylsilylene(tetrahydroindenyl)(decyalmino)titanium dichloride, dimethylsilylene-(tetrahydroindenyl)(trimethylsilylmino)titanium dichloride, dimethylsilylene(2-indenyl)(tert-butylmino)titanium dichloride, dimethylsilylene(2-indenyl)(isopropylmino)titanium dichloride, dimethylsilylene(2-indenyl)(benzylmino)titanium dichloride, dimethylsilylene(2-methylbenzoindenyl)(tert-butylmino)titanium dichloride, isopropylidene(tetrahydroindenyl)(decylamino)titanium dichloride, isopropylidene(tetrahydroindenyl)(trimethylsilylmino)titanium dichloride, isopropylidene(2-indenyl)(tert-butylmino)titanium dichloride, isopropylidene(2-indenyl)(isopropylmino)titanium dichloride, isopropylidene(2-indenyl)-(benzylmino)titanium dichloride and isopropylidene(2-methylbenzoindenyl)(tert-butylmino)titanium dichloride.

It is important that this transition metal compound represented by Formula (3) has at least one non-substituted part in the substituted cyclopentadienyl group and the substituted indenyl group in the formula, and such compound includes methylenebis(cyclopentadienyl)titanium dichloride, rac-methylenebis(indenyl)titanium dichloride, rac-ethylenebis(indenyl)titanium dichloride, rac-methylenebis(indenyl)titanium chlorohydride, ethylenebispentadienyltitanium dichloride, rac-ethylenebis(indenyl)methyltitanium chloride, rac-ethylenebis(indenyl)methoxychlorotitanium, rac-ethylenebis(indenyl)titanium diethoxide, rac-ethylenebis(indenyl)dimethyltitanium, rac-ethylenebis(4,5,6,7-tetrahydroindenyl)titanium dichloride, rac-ethylenebis(2-methylindenyl)titanium dichloride, rac-ethylenebis(2,4-dimethylindenyl)titanium dichloride, rac-ethylenebis(2-methyl-4-trimethylsilylindenyl)titanium dichloride, ethylene-(2,4-dimethylcyclopentadienyl)(3',5'-dimethylcyclopentadienyl)titanium dichloride, ethylene(2-methyl-4- tert-butylcyclopentadienyl)(3'-tert-butyl-5'-methylcyclopentadienyl)titanium dichloride, ethylene(2,3,5-trimethylcyclopentadienyl)(2',4',5'-trimethylcyclopentadienyl)titanium dichloride, isopropylidene (cyclopentadienyl)titanium dichloride, isopropylidene (cyclopentadienyl)(indenyl)titanium dichloride, rac-isopropylidenebis(2-methylindenyl)titanium dichloride, rac-isopropylidenebis(indenyl)titanium dichloride, rac-isopropylidenebis(2,4-dimethylindenyl)titanium dichloride, rac-isopropylidenebis(4,5-benzoindenyl)titanium dichloride, isopropylidene(2,4-dimethylcyclopentadienyl)(3',5'-dimethylcyclopentadienyl)titanium dichloride, isopropylidene(2-methyl-4-tert-butylcyclopentadienyl)(3'-tert-butyl-5'-methylcyclopentadienyl)titanium dichloride, methylene(cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)trimethylcyclopentadienyl)titanium dichloride, methylene(cyclopentadienyl)(tetramethylcyclopentadienyl)titanium dichloride, isopropylidene (cyclopentadienyl)(3,4-dimethylcyclopentadienyl)titanium dichloride, isopropylidene(cyclopentadienyl)(tetramethylcyclopentadienyl)titanium dichloride, isopropylidene(cyclopentadienyl)(3-methylindenyl)titanium dichloride, isopropylidene(cyclopentadienyl)(fluorenyl)titanium dichloride, isopropylidene(2-methylcyclopentadienyl)(fluorenyl)titanium dichloride, isopropylidene(2,5-dimethylcyclopentadienyl)(3,4-dimethylcyclopentadienyl)titanium dichloride, isopropylidene(2,5-dimethylcyclopentadienyl)(fluorenyl)titanium dichloride, ethylene(cyclopentadienyl)(2,4-dimethylcyclopentadienyl)titanium dichloride, ethylene(cyclopentadienyl)(fluorenyl)titanium dichloride, ethylene(2,5-dimethylcyclopentadienyl)(fluorenyl)titanium dichloride, ethylene(2,5-diethylcyclopentadienyl)(fluorenyl)titanium dichloride, diphenylmethylene-(cyclopentadienyl)(3,4-diethylcyclopentadienyl)titanium dichloride, cyclohexylidene(cyclopentadienyl)(fluorenyl)titanium dichloride and cyclohexylidene(2,5-dimethylcyclopentadienyl)(3',4'-dimethylcyclopentadienyl)titanium dichloride.

In these transition metal compounds described above, allowed to be used are transition metal compounds obtained by substituting titanium with zirconium or hafnium and bromides or iodides obtained by substituting chlorine atoms in the chlorides with bromine atoms or iodine atoms. These transition metal compounds may be used alone or in combination of two or more kinds thereof.

Next, alumoxane, boroxane, borates, ionic compounds, Lewis acids, clay and mixtures thereof can be used as the promoter of the component (B) contained in the catalyst used in the present invention. Among these compounds, alumoxane and borates are particularly preferred.

This alumoxane shall not specifically be restricted, and suitable ones thereof include, for example, methylalumoxane, ethylalumoxane, butylalumoxane, isobutylalumoxane, tetramethyldialumoxane, tetraethyldialumoxane and tetraisobutyldialumoxane.

Suitable examples of the boroxane described above include methylboroxane and trimethylboroxane.

Further, suitable examples of the borate described above include triethylammonium tetraphenylborate, tri(n-butyl) ammonium tetraphenylborate, trimethylammonium tetraphenylborate, triethylammonium tetrakis (pentafluorophenyl)borate, tri(n-butyl)ammonium tetrakis (pentafluorophenyl)borate, triethylammonium hexafluoroarsenate, pyridinium tetrakis(pentafluorophenyl) borate, pyrrolinium tetrakis-(pentafluorophenyl)borate, N,N-dimethylanilinium tetrakis(pentafluorophenyl)borate, methyldiphenyl-ammonium tetrakis(pentafluorophenyl) borate, ferrocenium tetraphenylborate, dimethylferrocenium tetrakis(pentafluorophenyl)borate, ferrocenium tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate, silver tetraphenylborate, silver tetrakis-(pentafluorophenyl)borate, trityl tetraphenylborate, trityl tetrakis(pentafluorophenyl)borate, silver hexafluoroarsenate, silver hexafluoroantimonate and silver tetrafluoroborate.

The ionic compound described above includes silver trifluoromethanesulfonate and magnesium perchlorate.

The Lewis acid includes tris(pentafluorophenyl)boron, tris(heptafluoronaphthalinyl)boron, bis(pentafluorophenyl) boron fluoride and tris(diisobutylaminoxy)borane.

Next, naturally produced or artificially synthesized clay, clay minerals and ion-exchangeable layered compounds can be used as the clays described above. These clays are aggregates of fine silicate hydrate minerals and are substances having the properties that plasticity is produced by mixing a suitable amount of water and kneading and rigidity is shown by drying and that they are sintered by baking at a high temperature, and the clay minerals are silicate hydrates which are principal components of clay. Further, the ion-exchangeable layered compounds are compounds having a crystalline structure in which faces constituted by ionic bond are superposed parallel on each other by virtue of a weak bond and containing exchangeable ions, and the ion-exchangeable layered compounds are included in clay minerals in a certain case. These ion-exchangeable layered compounds include, for example, ionic crystalline compounds having a layered crystalline structure such as a hexagonal closest packing type, an antimony type, a cadmium chloride type and a cadmium iodide type.

Among these clays, clay minerals and ion-exchangeable layered compounds, particularly preferred are kaolin minerals which are clay minerals, serpentine and analogous minerals thereof, pyrophyllite, talc, mica clay minerals, chlorite, vermiculite, smectites, mixed layer minerals, sepiolite, parigolskite, allophane, imogolite, kibushi clay, gairome clay, hisingelite and nacrite. Smectites are more preferred. Among them, montmorillonite species, saponite species or hectolite species can suitably be used.

When these clays, clay minerals and ion-exchangeable layered compounds are used for the promoter of the component (B) used in the present invention, they are suitably used after subjected to chemical treatment and then treated with an organic silane compound.

This chemical treatment can be carried, for example, by a method such as acid treatment, alkaline treatment, salts treatment and organic matter treatment. In the case of this acid treatment, a method using hydrochloric acid and sulfuric acid is preferred, and this acid treatment makes it possible to remove impurities on the surface and elute cations of aluminium, iron, magnesium and the like present in the crystalline structure of clays to thereby allow the surface area thereof to grow large. Further, in the case of the alkaline treatment, a method using a sodium hydroxide aqueous solution and aqueous ammonia is preferred, and this makes it possible to change the crystalline structure of clays to a preferred form. In the salts treatment, magnesium chloride and aluminium chloride are used, and in the organic matter treatment, a method using organic aluminium, a silane compound and ammonium salts is preferred. In the case of these salts and organic matter treatments, ionic complexes, molecular complexes and organic complexes are formed, and the surface area and the layer-to-layer spacing can be changed to preferred forms. For example, exchangeable ions between the layers are substituted with different bulky ions by making use of the ion exchanging property, whereby intercalation substances residing in the state that a spacing between the layers is expanded can be obtained. In this case, the clays used for the raw material may be used for chemical treatment as they are or ones which water is added to and adsorbed into may be used or ones which are subjected in advance to heating and dehydrating treatment may be used.

The clays subjected to chemical treatment in such manner are treated with an organic silane compound. The organic silane compound suited to this treatment includes, for example, trialkylsilyl chlorides such as trimethylsilyl chloride, triethylsilyl chloride, triisopropylsilyl chloride, tert-butyldimethylsilyl chloride, tert-butyldiphenylsilyl chloride and phenethyldimethylsilyl chloride; dialkylsilyl dichlorides such as dimethylsilyl dichloride, diethylsilyl dichloride, diisporopylsilyl dichloride, bisphenethylsilyl dichloride, methylphenethylsilyl dichloride, diphenylsilyl dichloride, dimesitylsilyl dichloride and ditolylsilyl dichloride; alkylsilyl trichlorides such as methylsilyl trichloride, ethylsilyl trichloride, isporopylsilyl trichloride, phenylsilyl trichloride, mesitylsilyl trichloride, tolylsilyl trichloride and phenethylsilyl trichloride; silylhalides obtained by substituting the parts of the chlorides described above with other halogen elements; silylamines such as bis(trimethylsilyl)amine, bis(triethylsilyl)amine, bis(triisopropylsilyl)amine, bis(dimethylethylsilyl)-amine, bis(diethylmethylsilyl)amine, bis(dimethylphenylsilyl)amine, bis(dimethyltolylsilyl)amine, bis(dimethylmesitylsilyl)amine, N,N-dimethylamino-trimethylsilane, (diethylamino)trimethylsilane and N-(trimethylsilyl)imidazole; polysilanols called by a conventional name of peralkylpolysiloxypolyol; silanols such as tris(trimethylsiloxy)silanol; silylamides such as N,O-bis(trimethylsilyl)acetamide, bis(trimethylsilyl)trifluoroacetamide, N-(trimethylsilyl)acetamide, bis(trimethylsilyl)urea and trimethylsilyldiphenylurea; linear siloxanes such as 1,3-dichlorotetramethyldisiloxane; cyclic siloxanes such as pentamethylcyclopentasiloxane; tetraalkylsilanes such as dimethyldiphenylsilane, diethyldiphenylsilane and diisopropyldiphenylsilane; and trialkylsilanes such as trimethylsilane, triethylsilane, triisopropylsilane, tri-tert-butylsilane, triphenylsilane, tritolylsilane, trimesitylsilane, methyldiphenylsilane, dinaphthylmethylsilane and diphenylmethylsilane.

Among these organic silane compounds, the compounds having at least one alkyl group directly bonded to a silicon atom are preferred, and alkylsilyl halides, particularly dialkylsilyl halides are suitably used. These organic silane compounds may be used alone or can be used in suitable combination of two ore more kinds thereof.

When the clays described above are treated with these organic silane compounds, they can effectively be treated with the organic silane compounds by carrying out the treatment in the presence of water. In this case, this water acts to destroy the crystalline structure (particularly layered structure) of the clays and raise a contact efficiency of the organic silane compound with the clays. That is, this water expands a space between the layers of the crystals in the clays to accelerate the diffusion of the organic silane compound into the crystals in the layers. Accordingly, the presence of water is important in the treatment of the clays with the organic silane compound, and an amount of water is conveniently increased. An addition amount of this water is 1 wt % or more, preferably 10 wt % or more and more preferably 100 wt % or more based on the dried mass of the raw material components of the clays. The dried raw material components of the clays means the dried clays obtained by putting the raw material components of the clays into a muffle furnace to elevate the temperature up to 150° C. in 30 minutes and maintaining them at 150° C. for one hour.

In respect of water used in this case, it is easy in terms of operation to use water inherently contained in the raw materials of clays as it is. When water is newly added, the clays may be suspended in water or a mixed solution of water and an organic solvent. Capable of being used as such organic solvent are alcohols, esters, halogenated hydrocarbons, aliphatic hydrocarbons and aromatic hydrocarbons.

The contact treatment of these clays with the organic silane compound may be carried out in the air, but it is more preferably carried out in an inert gas flow of argon or nitrogen. A use proportion of the organic silane compound used for this treatment is preferably controlled so that a mole number of a silicon atom in the organic silane compound is 0.001 to 1,000, preferably 0.01 to 100 per kg of the clays.

The catalyst used in the present invention comprises the transition metal compound of the component (A) and the promoter of the component (B) each described above as the essential structural components, and a catalyst obtained by adding thereto an alkylating agent as the component (C) may be used. Organic aluminium compounds, organic magnesium compounds and organic zinc compounds are used as this alkylating agent.

This organic aluminium compound includes, for example, trialkylaluminium such as trimethylaluminium, triethylaluminium, tri-n-propylaluminium, triisopropylaluminium, tri-n-butylaluminium, triisobutylaluminium and tri-tert-butylaluminium; dialkylaluminium halides such as dimethylaluminium chloride, diethylaluminium chloride, di-n-propylaluminium chloride, diisopropylaluminium chloride, di-n-butylaluminium chloride, diisobutylaluminium chloride and di-tert-butylaluminium chloride; dialkylaluminium alkoxides such as dimethylaluminium methoxide and dimethylaluminium ethoxide; and dialkylaluminium hydrides such as dimethylaluminium hydride, diethylaluminium hydride and diisobutylaluminium hydride.

Dimethylmagnesium, diethylmagnesium, di-n-propylmagnesium and diisopropylmagnesium are suitably used as the organic magnesium compound. Suitable examples of the organic zinc compound include dimethylzinc, diethylzinc, di-n-propylzinc and diisopropylzinc.

Next, when using the respective catalyst components described above to prepare the catalyst, contact operation is preferably carried out under inert gas environment of nitrogen gas and the like. These respective catalyst components may be prepared in advance in a catalyst-preparing bath and then used or they may be prepared in a polymerization reactor for copolymerizing the α-olefin with the aromatic vinyl compound and used as they are.

Next, the polymerization catalyst obtained in the manner described above is used to produce the copolymer of the α-olefin and the aromatic vinyl compound or a ternary or quaternary copolymer comprising cyclic olefin and/or diene in addition to the α-olefin and the aromatic vinyl compound.

The α-olefin, the aromatic vinyl compound, the cyclic olefin and the diene which are used for producing these copolymers include those given above as the examples.

Next, bulk polymerization and solution polymerization can suitably be adopted as a polymerization method used in producing the α-olefin-aromatic vinyl compound copolymer. Used as a solvent used in the solution polymerization method are aliphatic hydrocarbons such as butane, pentane and hexane; alicyclic hydrocarbons such as cyclohexane; aromatic hydrocarbons such as benzene, toluene and xylene; and liquefied α-olefin. The polymerization temperature shall not specifically be restricted and falls in a range of usually −50 to 250° C., preferably 0 to 200° C. The pressure in polymerization falls in a range of atmospheric pressure to 20 MPa, preferably atmospheric pressure to 10 MPa.

In the copolymerization of these α-olefin and aromatic vinyl compound or cyclic olefin and diene, a chain transfer agent may be used as a component (D) together with the catalyst described above. Suitably used as such chain transfer agent are silanes such as silane, phenylsilane, methylsilane, ethylsilane, butylsilane, octylsilane, diphenylsilane, dimethylsilane, diethylsilane, dibutylsilane and dioctylsilane and hydrogen. They may be used alone or in combination of two or more kinds thereof.

EXAMPLES

The present invention shall more specifically be explained below with reference to examples, but the present invention shall by no means be restricted by these examples.

Example 1

An autoclave having a volume of 1.6 liter equipped with a catalyst-introducing tube was charged in order with 180 ml of toluene, 200 ml of styrene and 1.0 ml of a 1.0M toluene solution of triisobutylaluminium and heated to 50° C., followed by introducing ethylene at 0.3 MPa·G. Then, added from the catalyst-introducing tube was a mixture of 10.0 micro mole of (isopropylidene)(dimethylsilylene)bis(cyclopentadienyl)titanium dichloride dissolved in 20 ml of toluene and 10.0 millimole of methylalumoxane. Then, polymerization was carried out for one hour while continuously feeding ethylene so that a pressure of 0.3 MPa·G was maintained, followed by terminating the polymerization by adding methanol. A large amount of methanol was added to separate the polymer by filtering, and it was dried at 60° C. for 4 hours under reduced pressure. As a result thereof, 12 g of an ethylene-styrene copolymer was obtained. The weight average molecular weight was measured by GPC-FT/IR shown below to find that it was 9,200 in terms of polystyrene and that the molecular weight distribution was 2.1. Further, $^{13}$C-NMR was measured by a method described in the specification to find that the styrene content was 53.7 mole %. The resulting $^{13}$C-NMR chart was shown in A of FIG. 1.

Measurement By GPC-FT/IR
Measuring Equipment
(1) GPC Column Oven manufactured by GL Science Co., Ltd.
(2) GPC-FTIR
    Nicolet MAGNA-IR 650 SPECTROMETER
(3) Data analysis software
    OMNIC SEC-FTIR Ver. 2. 10. 2 software
Measuring Conditions
(1) Solvent: 1,2,4-trichlorobenzene
(2) Temperature: 145° C.
(3) Flow rate: 1.0 ml/min
(4) Sample concentration: 0.3 (w/v) %
(5) Column: Shodex UT806MLT two columns
    The molecular weight is a value in terms of PS.

A signal appearing in 29.46 ppm in FIG. 1 originates in a long chain of a methylene carbon, and assuming that an ethylene unit is represented by E, it can be assigned to a methylene carbon (Sδδ) originating in an EEE chain.

A signal appearing in 45.69 ppm is assigned to a Tδδ carbon based on a heterogeneous bond of an (ethylene-styrene-ethylene) chain and a Tγδ carbon based on an (ethylene-styrene-styrene-ethylene) chain. A signal appearing in 36.69 ppm is assigned to an S αγ carbon based on an (ethylene-styrene-ethylene) chain. A signal appearing in 27.37 ppm is assigned to an Sβδ carbon based on a (styrene-ethylene-styrene) chain. An integrated intensity of(Tδδ+Tγδ), Sαγ and Sβδ is almost :1:2:2, and the signal originating in a long chain of a methylene carbon is observed in 29.46 ppm as described above, so that an S/E chain structure I shown below is present assuming that a styrene unit is represented by S:

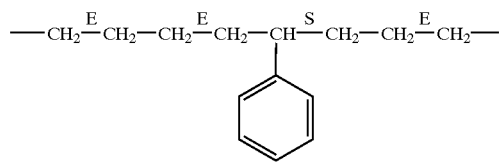

A signal appearing in 25.21 ppm is assigned to an S ββ carbon originating in an SES chain in an S/E chain structure II shown below:

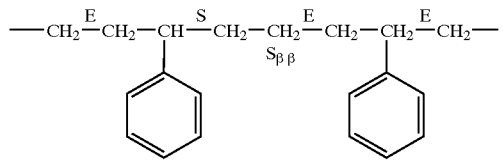

A signal appearing in 34.61 ppm is considered to be a signal assigned to an Sαβ carbon originating in a reverse bond of styrene shown by the following structure:

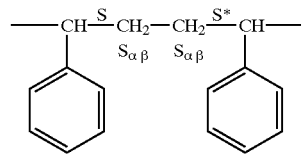

A signal appearing in 44.29 ppm and a signal appearing in 41.05 ppm are assigned to an Sαα carbon and a Tββ carbon respectively. They are signals originating in a triod chain of styrene-styrene.

The sum I(Tδδ+Tγδ+Tββ+Tβδ) of the respective intensities of the signals Tδδ, Tγδ, Tββ and Tβδ and the sum I(Tββ+Tβδ) of the respective intensities of the signals Tββ and Tβδ were determined based on the assignments described above to determine the blocking index (θ) by calculation to find that it was 29%. The results described above are shown in Table 1.

In calculating the intensities described above, (Tδδ+Tγδ) was referred to the signals appearing in 45 to 46.5 ppm; Tββ was referred to the signals appearing in 41 to 41.5 ppm; and Tβδ was referred to the signals appearing in 43 to 44 ppm, respectively.

Comparative Example 1

An autoclave having a volume of 1.6 liter equipped with a catalyst-introducing tube was charged in order with 180 ml of toluene, 200 ml of styrene and 1.0 ml of a 1.0M toluene solution of triisobutylaluminium and heated to 50° C., followed by introducing ethylene at 0.3 MPa·G. Then, added from the catalyst-introducing tube was a mixture of 10.0 millimole of methylalumoxane dissolved in 20 ml of toluene and 10.0 micro mole of bis(dimethylsilylene)bis(cyclopentadienyl)zirconium dichloride. Then, polymerization was carried out for one hour while continuously feeding ethylene so that a pressure of 0.3 MPa·G was maintained, followed by terminating the polymerization by adding methanol. A large amount of methanol was added to separate the polymer by filtering, and it was dried at 60° C. for 4 hours under reduced pressure. As a result thereof, 11 g of an ethylene-styrene copolymer was obtained.

Hereinafter, the same operation as in Example 1 was carried out. That is, the weight average molecular weight was measured by GPC-FT/IR to find that it was 16,400 in terms of polystyrene and that the molecular weight distribution was 2.0. The styrene content was measured by means of $^{13}$C-NMR to find that it was 22.3 mole %. The $^{13}$C-NMR of the polymer is shown in B of FIG. 1. The signal of Tββ originating in a triad chain of styrene-styrene was not observed. The blocking index (θ) determined by calculation was 0%. The results described above are shown in Table 1.

Example 2

An autoclave having a volume of 1.6 liter equipped with a catalyst-introducing tube was charged in order with 200 ml of styrene and 1.0 ml of a 1.0M toluene solution of triisobutylaluminium and heated to 50° C., followed by introducing ethylene at 0.1 MPa·G. Then, added from the catalyst-introducing tube was a mixture of 50.0 micro mole of (2-methylbenzoindenyl)-(t-butylamide)dimethylsilanetitanium dichloride dissolved in 20 ml of toluene and 10.0 millimole of methylalumoxane. Then, polymerization was carried out for 2 hours while continuously feeding ethylene so that a pressure of 0.1 MPa·G was maintained, followed by terminating the polymerization by adding methanol. A large amount of methanol was added to separate the polymer by filtering, and it was dried at 60° C. for 4 hours under reduced pressure. As a result thereof, 38.6 g of an ethylene-styrene copolymer was obtained.

Figure 2:
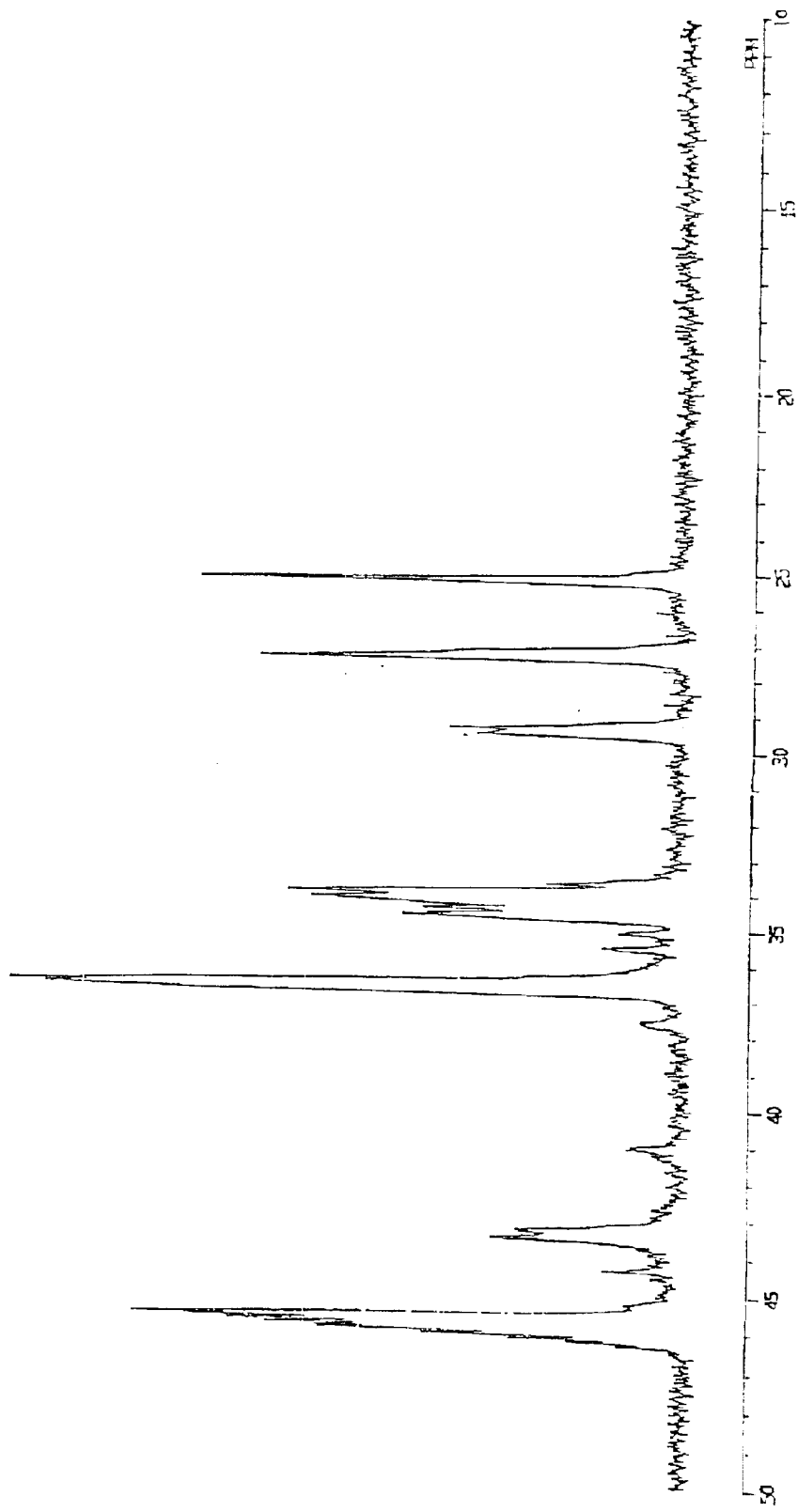
FIG. 2 is a $^{13}$C-NMR of the ethylene-styrene copolymer prepared in Example 2.

Hereinafter, the same operation as in Example 1 was carried out. That is, the weight average molecular weight was measured by GPC-FT/IR to find that it was 210,000 in terms of polystyrene and that the molecular weight distribution was 2.1. The styrene content was measured by means of $^{13}$C-NMR to find that it was 61.8 mole %. The 13C-NMR of the polymer is shown in FIG. 2. As can be seen in the signal appearing in 44.29 ppm and the signal appearing in 41.05 ppm, the signals of an Sαα carbon and a Tββ carbon originating in a triad chain of styrene-styrene were observed. The blocking index (θ) determined by calculation was 19%. The results described above are shown in Table 1.

Comparative Example 2

An autoclave having a volume of 1.6 liter equipped with a catalyst-introducing tube was charged in order with 180 ml of toluene, 200 ml of styrene and 1.0 ml of a 1.0M toluene solution of triisobutylaluminium and heated to 50° C., followed by introducing ethylene at 0.3 MPa·G. Then, added from the catalyst-introducing tube was a mixture of 10.0 millimole of methylalumoxane dissolved in 20 ml of toluene and 10.0 micro mole of (tetramethylcyclopentadienyl)(t-butylamide)dimethylsilanetitanium dichloride. Then, polymerization was carried out for 10 minutes while continuously feeding ethylene so that a pressure of 0.3 MPa·G was maintained, followed by terminating the polymerization by adding methanol. A large amount of methanol was added to separate the polymer by filtering, and it was dried at 60° C. for 4 hours under reduced pressure. As a result thereof, 38.8 g of an ethylene-styrene copolymer was obtained.

Figure 3:
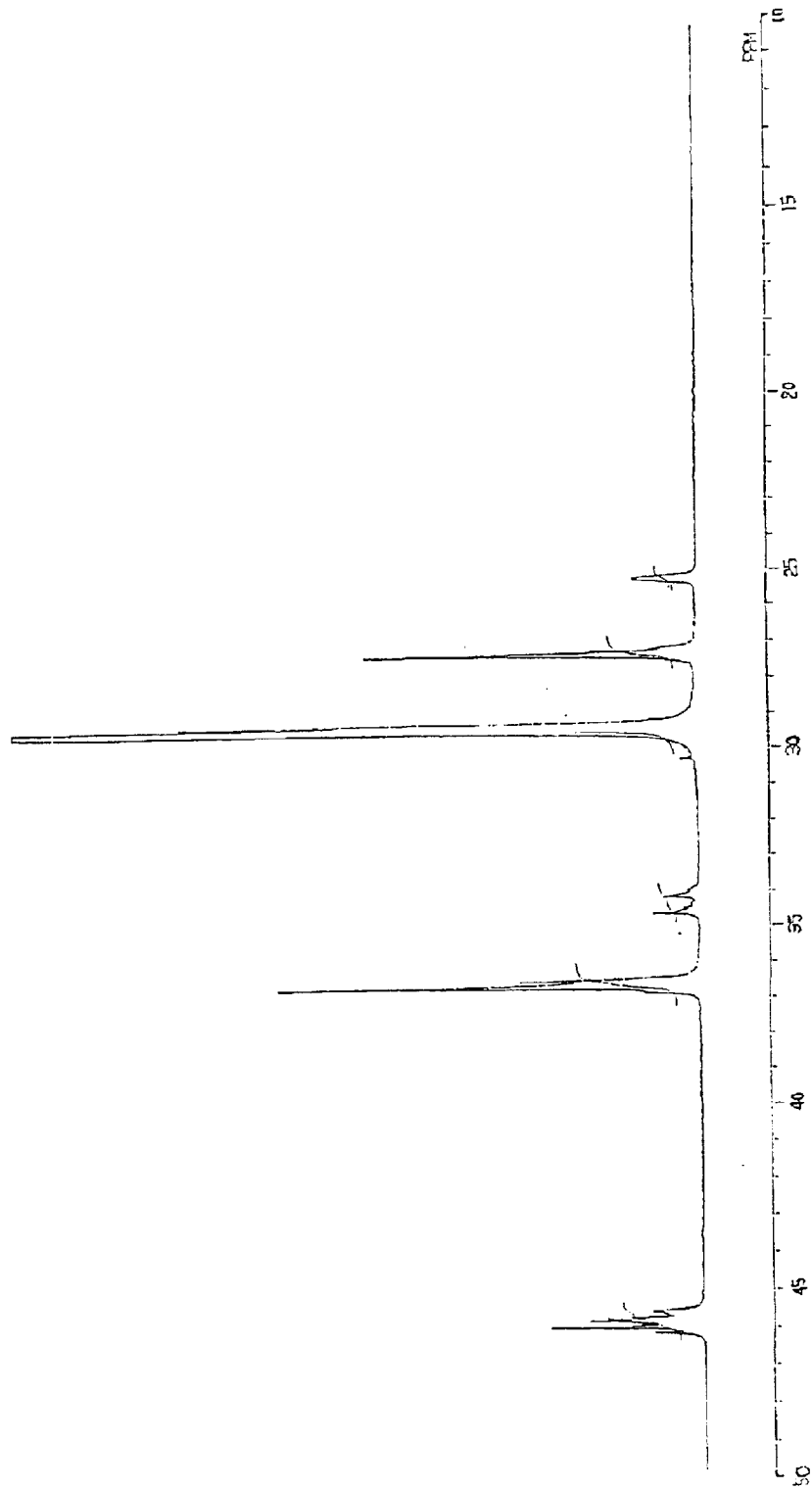
FIG. 3 is a $^{13}$C-NMR of the ethylene-styrene copolymer prepared in Comparative Example 2.

Hereinafter, the same operation as in Example 1 was carried out. That is, the weight average molecular weight was measured by GPC-FT/IR to find that it was 260,000 in terms of polystyrene and that the molecular weight distribution was 2.7. The styrene content was 36.7 mole %. The $^{13}$C-NMR of the polymer is shown in FIG. 3. The signal of Tββ originating in a triad chain of styrene-styrene was not observed. The blocking index (θ) determined by calculation was 0%. The results described above are shown in Table 1.

TABLE 1

| Chemical shift value (ppm) | Assignment | Example 1 | Comparative Example 1 | Example 2 | Comparative Example 2 |
|---|---|---|---|---|---|
| 45.69 | T δ δ / T γ δ | Observed | Observed | Observed | Observed |
| 44.29 | S α α | Observed | Not observed | Observed | Not observed |
| 43.43 | T β γ | Observed | Not observed | Observed | Not observed |
| 41.05 | T β β | Observed | Not observed | Observed | Not observed |
| 36.69 | S α γ | Observed | Observed | Observed | Observed |
| 34.61 | S α β | Observed | Observed | Observed | Observed |
| 29.46 | S δ δ | Observed | Observed | Observed | Observed |
| 27.37 | S β γ | Observed | Observed | Observed | Observed |
| 25.21 | S β β | Observed | Observed | Observed | Observed |
| Blocking index θ (%) | | 29 | 0 | 19 | 0 |
| Weight average molecular weight | | 9,200 | 16,400 | 210,000 | 260,000 |
| Styrene content (mole %) | | 53.7 | 22.3 | 61.8 | 36.7 |

Industrial Applicability

According to the present invention, provided is a novel α-olefin-aromatic vinyl compound copolymer comprising a structural unit having a low alternating property and a high blocking property, particularly a novel copolymer having a high blocking property of the aromatic vinyl compound component. This makes it possible to improve a mechanical strength of the α-olefin-aromatic vinyl compound copolymer.

What is claimed is:

1. A process for producing an atactic α-olefin-aromatic vinyl compound copolymer, the process comprising copolymerizing in a temperature range of 50–200° C. an α-olefin with an aromatic vinyl compound in the presence of a polymerization catalyst comprising a transition metal compound (A) and a promoter catalyst component (B), wherein the atactic α-olefin-aromatic vinyl compound copolymer comprises:

(I) the α-olefin, and (II) 0.1 to 90 mole % of the aromatic vinyl compound, wherein the atactic α-olefin-aromatic vinyl compound copolymer has a molecular weight distribution measured by a GPC method of 3.0 or less, wherein in a $^{13}$C-NMR measurement the following signals are present:

a signal (Sββ) based on an (aromatic vinyl compound-olefin-olefin) chain, a signal (Sββ) based on an (aromatic vinyl compound-olefin-aromatic vinyl compound) chain, a signal (Tββ) based on a blocking (aromatic vinyl compound-aromatic vinyl compound-aromatic vinyl compound) chain in the aromatic vinyl compound, and a signal (Sββ) based on a blocking (olefin-olefin-olefin) chain in the olefin part;

wherein an index (θ) showing a blocking property of the aromatic vinyl compound component which is represented by the following relational equation is 10 to 80%:

$$\theta = I(T\beta\beta + T\beta\delta)/[I(T\delta\delta + T\gamma\delta T\beta\beta + T\beta\delta)] \times 100,$$

wherein I(Tββ+Tβδ) represents the sum of the intensities of the signals Tββ and Tβδ in the $^{13}$C-NMR measurement, provided that Tβδ represents a signal based on an (aromatic vinyl compound-aromatic vinyl compound-olefin) chain; and I(Tδδ+Tγδ+Tβδ) represents the sum of the respective intensities of the signals Tδδ, Tγδ, Tββ and Tβδ based on all chains in which the aromatic vinyl compound participates among the chains of the above copolymer in the $^{13}$C-NMR measurement, Tδδ represents a signal based on an (olefin-aromatic vinyl compound-olefin) chain, and Tγδ represents a signal based on a heterogeneous bond of an (aromatic vinyl compound-aromatic vinyl compound-olefin-olefin) chain or a signal based on a heterogeneous bond of an (aromatic vinyl compound-olefin-aromatic vinyl compound-olefin) chain, wherein the component (A) in the polymerization catalyst is a transition metal compound Formula (1):

(1)

wherein $A^1$ and $A^2$ each represent independently a cyclopentadienyl group, or a substituted cyclopentadienyl group;

$Y^1$ represents propylidene group;

$Y^2$ represents dimethylsilylene group;

$M^1$ represents titanium, zirconium or hafnium; and $X^1$ and $X^2$ each represent independently a hydrogen atom, a halogen atom, an alkyl group, an alkoxy group or an aryloxy group.

2. The process as described in claim 1, wherein the index (θ) showing a blocking property of the aromatic vinyl compound component is 10 to 70%.

3. The process as described in claim 1, wherein the aromatic ring is atactic in the chain of the aromatic vinyl compound component contained in the copolymer.

4. The process as described in claim 1, wherein said polymerization catalyst further comprises an alkylating agent (C).

5. The process as described in claim 1, wherein the promoter of the component (B) is selected from the group consisting of alumoxane, boroxane, borate, an ionic compound, a Lewis acid or clay and a mixture thereof.

6. The process as described in claim 4, wherein the alkylating agent (C) is an organic aluminum compound, an organic magnesium compound or an organic zinc compound.

7. The process as described in claim 1, wherein the aromatic vinyl compound is styrene.

8. The process as claimed in claim 1, wherein the atactic α-olefin-aromatic vinyl compound copolymer has a molecular weight distribution of 1.5 to 3.0.

9. The process as claimed in claim 1, wherein the atactic α-olefin-aromatic vinyl compound copolymer has a weight average molecular weight of 1,000 to 1,000,000.

10. The process as claimed in claim 1, wherein the atactic α-olefin-aromatic vinyl compound copolymer has a weight average molecular weight of 5,000 to 800,000.

11. The process as claimed in claim 1, wherein the atactic α-olefin-aromatic vinyl compound copolymer further comprises in copolymerized form a monomer selected from the group consisting of a cyclic olefin, a diene and mixtures thereof.

12. The process as claimed in claim 11, wherein the atactic α-olefin-aromatic vinyl compound copolymer is a ternary copolymer.

13. The process as claimed in claim 11, wherein the atactic α-olefin-aromatic vinyl compound copolymer is a quaternary copolymer.

14. The process as claimed in claim 1, wherein the atactic α-olefin-aromatic vinyl compound copolymer is an ethylene-styrene copolymer, a propylene-styrene copolymer or a butane-1-styrene copolymer.

15. The process as claimed in claim 1, wherein the amount of aromatic vinyl compound in the atactic α-olefin-aromatic vinyl compound copolymer is 0.1 to 30 mole %.

16. The process as claimed in claim 1, wherein the amount of aromatic vinyl compound in the atactic α-olefin-aromatic vinyl compound copolymer is 35 to 90 mole %.

17. The process as claimed in claim 12, wherein the ternary copolymer is selected from the group consisting of ethylene-styrene-norbornene copolymers, ethylene-styrene-butadiene copolymers, and ethylene-styrene-1.5-hexadiene copolymers.

* * * * *